United States Patent Office 3,338,146
Patented Aug. 29, 1967

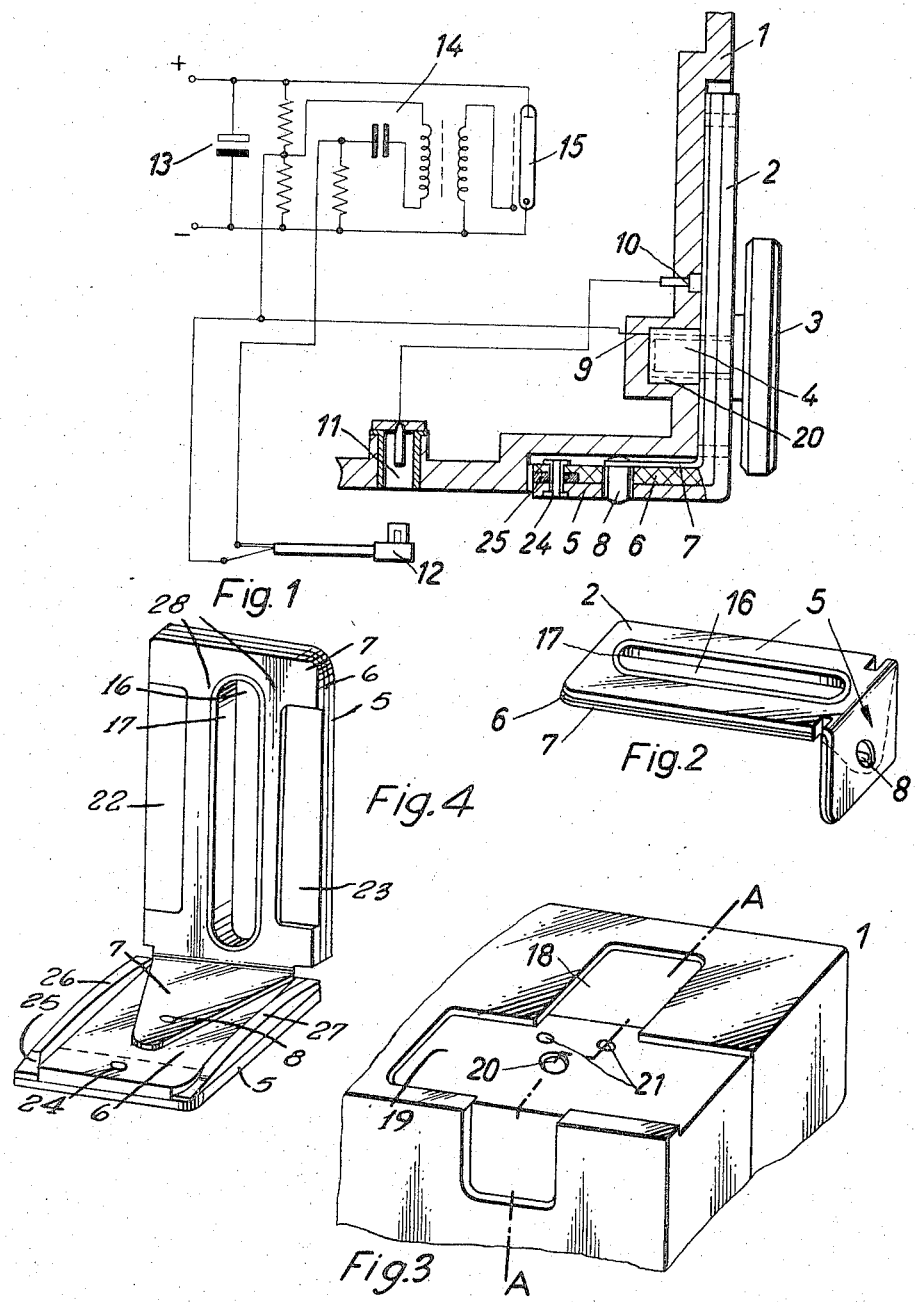

3,338,146
FLASH UNIT FOR PHOTOGRAPHIC PURPOSES WITH MOUNTING BRACKET
Walter Schmidt, Berlin, Germany, assignor to Loewe Opta G.m.b.H., Berlin, Germany, a company of Germany
Filed Dec. 21, 1964, Ser. No. 420,216
Claims priority, application Germany, Jan. 24, 1964, L 36,346
8 Claims. (Cl. 95—11)

The invention relates to flash units, more particularly electronic flash units, for photographic purposes with a mounting bracket attached to the housing of the unit to be swivelled and/or displaced by sliding, which units are connectable to the release contact (synchronous contact) provided in the camera, namely either by way of the mounting bracket or by means of the synchronizing cable. The aim of the invention is to form this mounting bracket so that when it is used in connection with standard cameras, i.e. *without* electric connection with the ignition circuit of the flash unit by way of the accessory shoe of the camera and the mounting bracket, the ignition circuit can never be short-circuited, and further so that no contact voltage can occur on the mounting bracket when this is pushed into the housing of the flash unit and/or is in position of rest or for carrying laid against the wall of the housing.

Flash units in which electric means of contact are provided inside the mounting bracket, which means go into action when the flash unit is pushed into the camera accessory shoe, are known.

The flash unit according to the invention is characterized in that the mounting bracket consists of a metallic main component and, insulated against this by an insulation layer, a further contact component preferably formed as a metallic spring bearing a contact piece, and in that when a camera is used with a central contact for the conductive connection between ignition circuit and camera synchronous-contact built into the accessory shoe, the metallic main component serves for giving contact with the frame of the camera housing and the further contact component preferably formed as a spring serves to contact with the central contact built into the accessory shoe of the camera, and further in that in the carrying or rest position of the mounting bracket the electric connection of the same with the conducting pole of the ignition switch is broken.

A further characteristic of the invention is that a contact fixedly attached to the flash unit housing in the region of the mounting bracket forms the connection between the further metallic contact component, e.g. spring, and the other pole of the ignition circuit and/or the synchronizing cable socket, and the further metallic contact component, e.g. spring, of the mounting bracket is formed so that only in the operating position of the mounting bracket is the conductive connection made to the contact fixedly attached to the flash unit in the region of the mounting bracket. To this end the further metallic contact component, e.g. spring, has a recess so long that in the rest position of the mounting bracket, contacting between the contact component and the contact fixedly attached to the flash unit in the region of the mounting bracket is impossible.

Further, according to the invention the element for fastening the mounting bracket to the unit housing, e.g. a knurled screw, serves at the same time as an electrically conductive connecting member between the metallic main component and a pole of the ignition circuit incorporated in the flash unit and/or a synchronizing cable socket built into the flash unit.

For the mounting bracket a groove is appropriately provided in the wall of the flash unit housing, in which groove the mounting bracket can at will be fixed and displaced by sliding into a sunk position. Two grooves disposed vertically to each other and intersecting can also be provided in order that the mounting bracket can be disposed on the unit housing at will in two different, mutually vertical, positions. For this choice the further metallic contact component, e.g. spring, of the mounting bracket has a recess on each of its longitudinal sides and correlated with these recesses two contacts inside the two grooves in the unit housing in such a way that the contacts are in each of the two optionally possible operating positions of the mounting bracket electrically connected with the further contact component, e.g. spring, and in the rest or carrying position of the mounting bracket no contacting occurs.

Further details of the invention are now given by way of the exemplary designs shown in the drawings:

FIG. 1 shows a section through a portion of the flash unit housing with the mounting bracket laid against it in the rest or carrying position. It is represented somewhat enlarged with indication of the flash circuit in schematic form;

FIG. 2 represents the mounting bracket itself in perspective; and

FIG. 3 shows a perspective view of a cut-out of the unit housing with a groove disposed in the shape of a cross to accommodate the mounting bracket.

FIG. 4 illustrates in perspective and enlarged the structure of the mounting bracket, seen from the inner side.

In FIG. 1, 1 is the flash unit housing wall in which the mounting bracket 2 is fixed in the rest or carrying position by means of the knurled screw 3. By loosening the knurled screw 3 the mounting bracket 2 can be pushed down into the operating position. 4 is the threaded body of the knurled screw which is screwed into the threaded opening 20 of the unit housing. The mounting bracket 2 consists of the outer metallic main component 5 and the inner further contact component 7, which is designed e.g. as a spring. The components 5 and 7 are separated by an insulating layer 6. The contact component 7 further bears a contact piece 8 passing through an opening in parts 5 and 6 of the mounting bracket in order to establish contact on being pushed into the accessory shoe of the camera (not shown), if the flash unit shall be used in combination with a camera. The contact piece 8 and the element 10—the latter being fixed within the housing wall 1—serve to establish electric connection with the two poles of the ignition circuit of the flash unit. This ignition circuit consists of the storage condenser 13 and the actual ignition circuit 14 with flash tube 15 indicated schematically in the left upper part of FIG. 1.

11 is a contact socket also disposed in the wall of the housing of the flash unit and accommodates the plug 12 of the synchronizing cable. This plug 12 is inserted in the socket 11 when the flash unit is used in combination with modern cameras in which an electric central contact for connection with the flash circuit is provided in the accessory shoe. In this case the electric connection of the synchronous shutter of the camera is made over the contact parts of the mounting bracket 2 and this socket 11 with inserted plug 12 to flash circuit 14. In using cameras without the electric central contact installed in the accessory shoe, plug 12 of the synchronizing cable is inserted in the conventional way in the appropriate synchronizing cable junction on the camera objective. In this case mounting bracket 2 only fixes mechanically the flash unit to the camera without forming simultaneously an electric connection to the flash circuit.

24 is the riveted joint for holding together the parts of mounting bracket 2; 25 is the inlaid spring piece with the metallic springs 26 and 27 (see FIG. 4).

As FIG. 2 shows, mounting bracket 2 is slidable according to the length of slot 16 as soon as knurled screw 3 is loosened. In the operating position accordingly mounting bracket 2 is pushed down the flash unit housing wall as far as this slot 16 allows. Then the lower end of mounting bracket 2 with contact piece 8 is free and can be inserted in the accessory shoe slide of the camera. The contact components of mounting bracket 2 are insulated by insulating sleeve 17, which completely encloses slot 16.

FIG. 3 shows thread hole 20 in groove 19 and/or 18 in the housing wall. Both grooves 18 and 19 intersect at right angles. Contacts 21 correspond to contact 10 in FIG. 1 and are doubled to enable contacting with mounting bracket 2 in the operating position and also in the two possible positions of mounting bracket 2 in each of the two grooves 18 and 19.

This is achieved by the spring contact component 7 of the mounting bracket having recesses 22 and 23 on each side, as shown in FIG. 4. In the carrying or rest position of mounting bracket 2 contacts 21 of the unit wall lie in these recesses 22 and 23 and cannot set up any electric contact with the ignition circuit. In the operating position the mounting bracket is displaced so that contacts 21 can make contact at 28 at the outer end of contact component 7. In FIG. 4 the rest of the mounting bracket structure is also clearly visible, i.e. the other end of contact component 7 with contact piece 8, further the intermediate part 25 carries springs 26 and 27 which holding the mounting bracket under spring pressure in the accessory shoe of the camera. Insulating layer 6 insulates this part 25 with springs 26 and 27 from contact component 7.

The advantage of the invention consists in enabling the use of the mounting bracket both for cameras with electric central contact in the accessory shoe slide and for cameras without such an electric central contact, further in that the ignition circuit of the flash unit can never be short-circuited and no contact voltage can occur on the mounting bracket when it is in the carrying or rest position.

What I claim is:

1. Electronic flash unit for photographic purposes comprising a housing including the electrical ignition circuit in connection with a flashlamp, a mounting bracket movably attached to said housing, a screw element for fixing said mounting bracket to said housing, a synchronizing cable as commonly used for connecting the flash unit to the camera shutter releasing means, means for electrically connecting the poles of said ignition circuit selectively via said mounting bracket and via said synchronizing cable or only via said synchronizing cable to said camera to which the flash unit is combined by pushing one end of said mounting bracket into the accessory shoe of said camera, a central contact piece within that part of said mounting bracket to be pushed into the accessory shoe of said camera, and a separate contact socket in said housing for the connection of the plug of said synchronizing cable in case of using a camera without central contact, said mounting bracket consisting of a metallic main component and a further metallic contact component separated from each other by an insulating layer, said latter contact element being fixedly and conductively connected to said central contact piece, said means for electrically connecting the poles of said ignition circuit via said mounting bracket to said camera consisting of a contact element fixed within said housing, of said separate contact socket conductively connected to said first contact element, of the plug of said synchronizing cable, and the latter cable itself, and of said screw element, said central contact piece being adapted to make electric contact with the corresponding central contact in the accessory shoe of said camera as soon as said mounting bracket containing said central contact piece is displaced into its operating position and is pushed into said accessory shoe, whilst in the rest position of said mounting bracket the electric connection with said ignition circuit is interrupted.

2. Electronic flash unit as claimed in claim 1, wherein said further metallic contact component of said mounting bracket is supplied with recesses, which are so dimensioned as to be adapted to interrupt the electric contact between said further contact component of said mounting bracket and said contact element fixed within said housing as soon as said mounting bracket is in its rest position.

3. Electronic flash unit as claimed in claim 1, wherein said screw element for fixing said mounting bracket to the unit housing serves at the same time as an electrically conductive connecting member between said metallic main component and one pole of said ignition circuit incorporated in the flash unit.

4. Electronic flash unit as claimed in claim 1, wherein said mounting bracket has a longitudinal slot provided for said screw element and supplies with an insulating sleeve extending over its entire length and height.

5. Electronic flash unit as claimed in claim 1, wherein said mounting bracket has a longitudinal slot provided for said screw element and supplies with an insulating sleeve extending over its entire length and height, said insulating sleeve forming with said insulating layer arranged between said both metallic components of said mounting bracket a common component.

6. Electronic flash unit as claimed in claim 1, wherein said flash unit housing is supplied with a groove in which said mounting bracket can be optionally fixed and pushed into a sunken position.

7. Electronic flash unit as claimed in claim 1, wherein said flash unit housing wall is supplied with two mutually vertical and intersecting grooves for optionally fixing said mounting bracket in different positions to said unit housing, and the further metallic contact component of said mounting bracket has a recess on each longitudinal side, and wherein within said two grooves contacts are correlated with said recess so that these contacts are adapted to make electric contact with that further contact component in each of the two optionally possible operating positions of said mounting bracket and to let occur no contacting in the rest position of said mounting bracket.

8. Electronic flash unit as claimed in claim 1, wherein said mounting bracket is supplied with metallic springs on that end to be pushed into the accessory shoe of a camera, said springs holding said mounting bracket under spring pressure in the accessory shoe of the camera.

No references cited.

JOHN M. HORAN, *Primary Examiner.*